US008949788B2

(12) United States Patent
Bonnet

(10) Patent No.: US 8,949,788 B2
(45) Date of Patent: Feb. 3, 2015

(54) BUILDING AND PACKAGING SOFTWARE

(75) Inventor: Michael Stavros Bonnet, Boston, MA (US)

(73) Assignee: Red Hat, Inc., Raleigh, NC (US)

(*) Notice: Subject to any disclaimer, the term of this patent is extended or adjusted under 35 U.S.C. 154(b) by 1493 days.

(21) Appl. No.: 12/337,553

(22) Filed: Dec. 17, 2008

(65) Prior Publication Data
US 2010/0153920 A1 Jun. 17, 2010

(51) Int. Cl.
G06F 9/44 (2006.01)
G06F 9/45 (2006.01)
G06F 3/048 (2013.01)

(52) U.S. Cl.
CPC ... G06F 8/35 (2013.01); G06F 8/36 (2013.01)
USPC ........... 717/122; 717/104; 717/123; 717/163; 717/178; 715/763

(58) Field of Classification Search
CPC .............. G06F 8/35; G06F 8/36; G06F 11/35
See application file for complete search history.

(56) References Cited

U.S. PATENT DOCUMENTS

| | | | | |
|---|---|---|---|---|
| 5,872,977 A * | 2/1999 | Thompson | ...................... | 717/122 |
| 6,397,385 B1 * | 5/2002 | Kravitz | ........................... | 717/173 |
| 6,871,345 B1 * | 3/2005 | Crow et al. | .................... | 717/175 |
| 7,590,980 B1 * | 9/2009 | Clubb et al. | ................... | 717/163 |
| 7,596,782 B2 * | 9/2009 | Ebbo et al. | ..................... | 717/141 |
| 7,958,454 B2 * | 6/2011 | Gaudette | ......................... | 715/763 |
| 8,037,453 B1 * | 10/2011 | Zawadzki | ...................... | 717/123 |
| 8,141,031 B2 * | 3/2012 | Iborra et al. | ................... | 717/104 |
| 8,438,532 B2 * | 5/2013 | Fox et al. | ....................... | 717/101 |
| 2003/0046682 A1 * | 3/2003 | Crespo et al. | .................. | 717/178 |
| 2003/0177473 A1 * | 9/2003 | Banerjee et al. | ............... | 717/115 |
| 2003/0182411 A1 * | 9/2003 | Wang et al. | .................... | 709/223 |
| 2003/0182652 A1 * | 9/2003 | Custodio | ........................ | 717/122 |
| 2006/0031226 A1 * | 2/2006 | Cope et al. | ...................... | 707/10 |
| 2006/0271924 A1 * | 11/2006 | Calcaterra et al. | ............ | 717/168 |
| 2007/0060113 A1 * | 3/2007 | Bonnette et al. | ............... | 455/418 |
| 2007/0168940 A1 * | 7/2007 | Lunawat | ....................... | 717/108 |

(Continued)

OTHER PUBLICATIONS

John Ferguson Smart et al., "An introduction to Maven 2", [Online], 2005, pp. 1-11, [Retrieved from Internet on Mar. 7, 2012], <http://www.tecgraf.puc-rio.br/~ismael/Cursos/Senac_MTSW/aulas/Modulo2_TecnicasDesnvolvimentoAgeis/2-Maven/articles/Maven2_Intro_jw-1205.pdf>.*

(Continued)

*Primary Examiner* — Thuy Dao
*Assistant Examiner* — Ziaul A Chowdhury
(74) *Attorney, Agent, or Firm* — Lowenstein Sandler LLP

(57) ABSTRACT

A method and apparatus for building a source code based on a project object model (POM) from a source control and for tracking a build environment of the source code is described. Plugins to complete the build as configured in the POM are downloaded from an external plugin repository. A local plugin repository is scanned to determine which plugins have already been downloaded. The local plugin repository is rescanned to determine whether any additional plugins and associated plugins POM files were downloaded during the build as build dependencies. Information of one or more referenced files is inserted into a database wherein the referenced files are identified as build dependencies. Information about the newly-built plugins and associated plugins POM files in the output directory are extracted and added to the database for use by subsequent builds.

12 Claims, 3 Drawing Sheets

(56) References Cited

U.S. PATENT DOCUMENTS

| | | | | |
|---|---|---|---|---|
| 2007/0174814 | A1* | 7/2007 | Komissarchik et al. | 717/115 |
| 2008/0052663 | A1* | 2/2008 | Cope et al. | 717/101 |
| 2009/0144703 | A1* | 6/2009 | Vairavan et al. | 717/122 |
| 2009/0254912 | A1* | 10/2009 | Roundtree et al. | 718/102 |
| 2009/0300604 | A1* | 12/2009 | Barringer | 717/178 |
| 2010/0050156 | A1* | 2/2010 | Bonanno et al. | 717/122 |
| 2010/0175044 | A1* | 7/2010 | Doddavula et al. | 717/104 |
| 2012/0254828 | A1* | 10/2012 | Aiylam et al. | 717/104 |

OTHER PUBLICATIONS

Tony Griffiths et al., "Teallach: A Model-based User Interface Development Environment for Object Databases", [Online], May 2001, pp. 31-68, [Retrived from Internet on Sep. 13, 2014], <http://iwc.oxfordjournals.org/content/14/1/31.full.pdf>.*

Oscar Pastor et al., "From Object Oriented Conceptual Modeling to Automated Programming in Java" [Online], 1998, pp. 183-196, [Retrieved from Internet on Sep. 13, 2014], <http://download.springer.com/static/pdf/823/chp%253A10.1007%252F978-3-540-49524-6__16.pdf>.*

Niels Pinlkwort , "A Plug-In Architecture for Graph Based Collaborative Modeling Systems", [Online], 2003, pp. 1-6, [Retrieved from Internet on Sep. 13, 2014], <http://hal.archives-ouvertes.fr/docs/00/19/01/17/PDF/Pinkwart__2003.pdf>.*

Estefanía Serral et al., "Towards the Model Driven Development of context-aware pervasive systems", [Online], 2009. pp. 1-27, [Retrieved From Internet on Sep. 13, 2014], <http://www.inf.udec.cl/~adweb/docs/ecweb2009/sdarticle.pdf>.*

* cited by examiner

BUILDING AND PACKAGING SOFTWARE

TECHNICAL FIELD

Embodiments of the present invention relate to computing systems, and more particularly, to building and packaging software.

BACKGROUND

A software package is used in object-oriented programming to name a group of related classes of a program. Packages are useful to measure and control the inherent coupling of a program. An example of a package is the Java package which contains or groups together all the classes in the Java programming language that aid input and output of data, such as the buffered reader class which is used to accept user input from the keyboard.

However, each software package may be built using different environment and different versions. In order to reproduce the build at a future date, one would have to track down the version and the platform that was used to build the software package.

BRIEF DESCRIPTION OF THE DRAWINGS

The present invention is illustrated by way of example, and not by way of limitation, in the figures of the accompanying drawings and in which.

DETAILED DESCRIPTION

Figure 1:
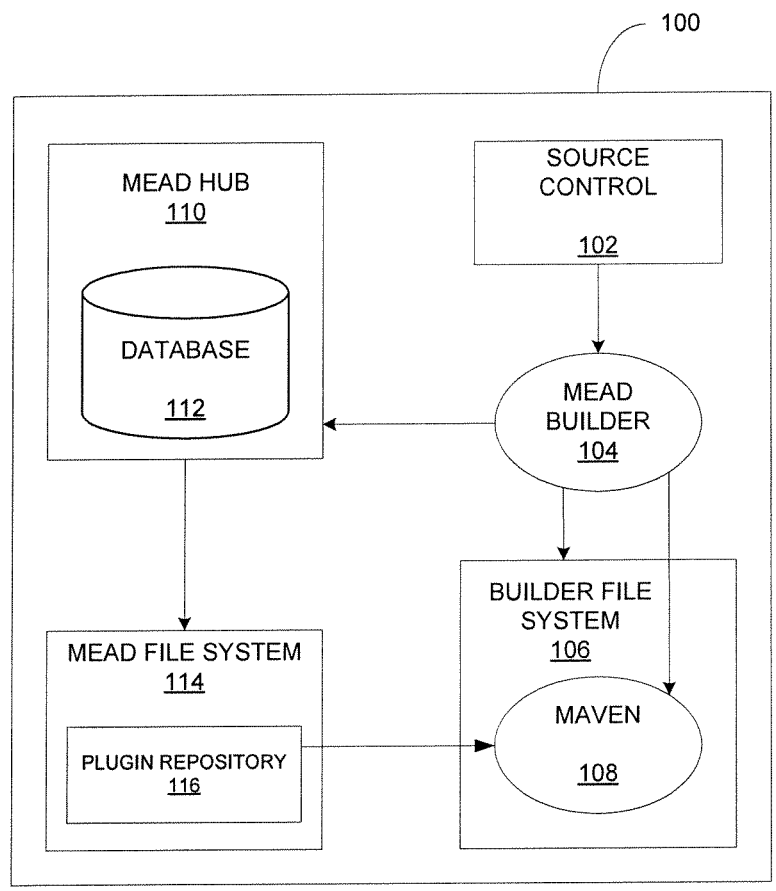
FIG. 1 is a block diagram illustrating one embodiment of a system for building and packaging software.

Described herein is a method and apparatus for building a source code based on a project object model (POM) from a source control and for tracking a build environment of the source code. Plugins to complete the build as configured in the POM are downloaded from an external plugin repository. A local plugin repository is scanned to determine which plugins have already been downloaded. The local plugin repository is rescanned to determine whether any additional plugins and associated plugins POM files were downloaded during the build as build dependencies. Information of one or more referenced files is inserted into a database wherein the referenced files are identified as build dependencies. Information about the newly-built plugins and associated plugins POM files in the output directory are extracted and added to the database for use by subsequent builds.

A Java package is a mechanism for organizing Java classes into namespaces. Java packages can be stored in compressed files called JAR files, allowing classes to download faster as a group rather than one at a time. Programmers also typically use packages to organize classes belonging to the same category or providing similar functionality. A package statement at the top of a Java source file which is common among a set of source files places a common namespace over those files. A package provides a unique namespace for the types it contains. Classes in the same package can access each other's protected members. A package can contain different types (classes, interfaces, enumerated types, annotations).

A common tool to build a software package is Maven. Maven attempts to simplify the build processes with a standard way to build the projects, a clear definition of what the project consisted of, an easy way to publish project information, and a way to share JARs across several projects. The tool can be used for building and managing Java-based projects.

Another tool is Koji which is a distributed build system developed by Red Hat Inc. The system is composed of several components: an xmlrpc server (the hub), a number of build daemons that run on separate hosts, a web interface, a command line interface, and other miscellaneous tools.

The hub is the core of the system and all components interface with it. It uses an underlying database and filesystem to store data. In normal circumstances, only the hub accesses this database directly or writes to the filesystem; the other components go through the xmlrpc api. Work is distributed to the build hosts by a task queue. Tasks are created through the hub and processed by the builders. The task structure is similar to xmlrpc, which means that tasks are essentially asynchronous xmlrpc calls. The system has a concept of subtasks and has a labeling mechanism that allows a parent task to be restarted without having to restart its child tasks. While many of the tasks in the system are devoted to performing builds, the task structure itself is generic and not inherently tied to building.

Koji is more than a tool for farming build jobs out to host machines. It also tracks and organizes the resulting builds. The system uses a complex, customizable structure for this organization. The unit of organization is called a "tag." At the most basic level, a tag is a collection of builds. However, tags support inheritance. That is, one tag can be set to inherit the contents of another. A tag can inherit from more than one tag (multiple inheritance), and lines of inheritance can be set with different options. These inheritance options include: intransitivity, maximum depth, and package filters. Inheritance allows an administrator to set up an wide range of different tag hierarchies. The content of tags is versioned. This means that a complete history of tag content is available in the system.

When the system performs a build, it creates a controlled build environment. This environment is based on the current contents of a tag. The contents of the build environment are logged in the system, which allows a build environment to be reproduced later.

Koji supports RPM packages (both in terms of what it would build and what it could install in a build environment). The system uses an underlying tool call "mock" to create the build environment. Support for building Java archives is added using the underlying tool Maven.

FIG. 1 is a block diagram illustrating one embodiment of a system 100 for building and packaging software. System 100 includes a source control 102, a builder 104, a builder file system 106, Maven tool 108, a hub 110, a database 112, and MEAD file system 114, and a plugin repository 116.

Source control 102 includes a source code from a version control system. System 100 is to build and package source code. The source code includes a Maven .pom file that contains information necessary to perform the build.

In one embodiment, builder module 104 includes a MEAD builder. MEAD is a tool that extends on Koji tool in that is enables the ability of reproducibility and auditability to build in Java environment. MEAD builder 104 invokes "maven resolve-plugins". This causes Maven 108 to download any plugins necessary to complete the build (as configured in the .pom file) from MEAD-managed repository 112.

MEAD builder 104 scans the local Maven repository 108 that has been created on the builder filesystem 106. MEAD builder 104 parses the .pom file to extract this information, and that information is recorded in the MEAD hub database 112, indicating that this build referenced that particular JAR and .pom file. Some JAR files are downloaded without an accompanying .pom file. In this case the file name, file size, and md5sum are looked up in database 112. If the file exists in database 112, its use by local Maven repository 108 is recorded. If the file does not exist in database 112, an error is raised. All files referenced by a build must have a pre-existing entry in database 112.

MEAD Builder 104 invokes "maven deploy", which builds the Java source and copies the resulting JARs and .pom files to the output directory.

MEAD Builder 104 rescans the local Maven repository to determine the additional JARs and .pom files that were downloaded during the build as build dependencies. Builder 104 inserts the information about referenced files into database 112, but marks these as "build dependencies" rather than "plugin dependencies". Newly-built JARs and .pom files will also exist in the local repository 108 and are excluded from the list of dependencies recorded in the database so an error is not raised about unknown files.

MEAD builder 104 extracts information about the newly-built JARs and .pom files in the output directory and sends it to MEAD hub 110, where it is added to database 112. Hub 110 deploys the files to the managed repository for use by subsequent builds.

As such, the feature of system 100 includes:
Automated, repeatable build process,
Tracking of build environment/buildroot contents,
Building directly from source control,
Building using unmodified upstream POM files,
Ability to trace build output (jars/wars) back to a Koji build,
The same jars end up in the Maven repo and yum repo (packaged in a wrapper rpm).

System 100 is not solely limited to building Java source code software package but may also be applicable to other types of source code.

Figure 2:
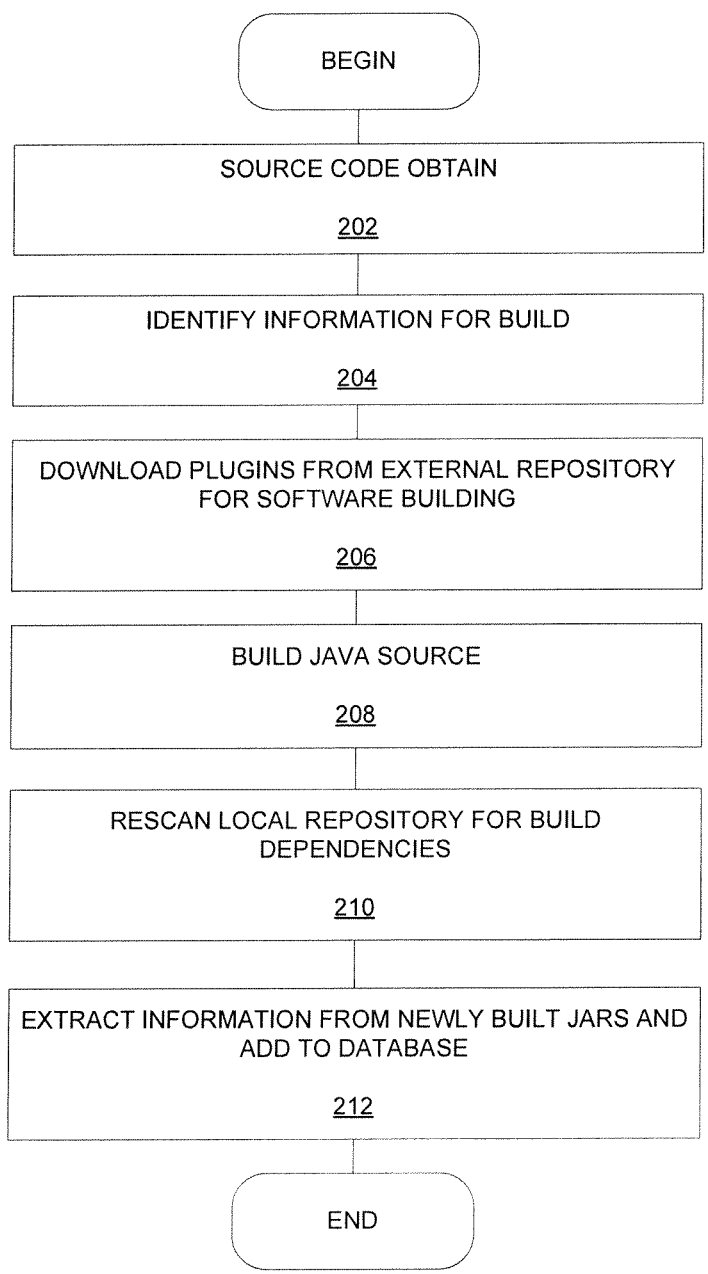
FIG. 2 is a flow diagram illustrating one embodiment of a method for building and packaging software.

FIG. 2 is a flow diagram illustrating one embodiment of a method for building and packaging software. At 202, the source code from a version control system is obtained. At 204, information for building the source code is identified. In one embodiment, the .POM file is identified.

At 206, plugins are downloaded from a managed plugin repository to complete the build as configured in the .POM file. In one embodiment, the local plugin repository is scanned to determine which plugins have already been downloaded, and that information is inserted into a database. At 208, the Java source is built and copied into the resulting JARs and .pom files to an output directory.

At 210, the local plugin repository is rescanned to determine any additional plugins and associated plugins POM files that were downloaded during the build as build dependencies. Information of referenced files is inserted into a database. The referenced files are identified as build dependencies. Those from the list of newly-built files in the output directory are excluded so an error is not raised about unknown files.

At 212, information about the newly-built JARs and .pom files are extracted in the output directory and added to the database. Files are deployed to the managed repository for use by subsequent builds.

Figure 3:
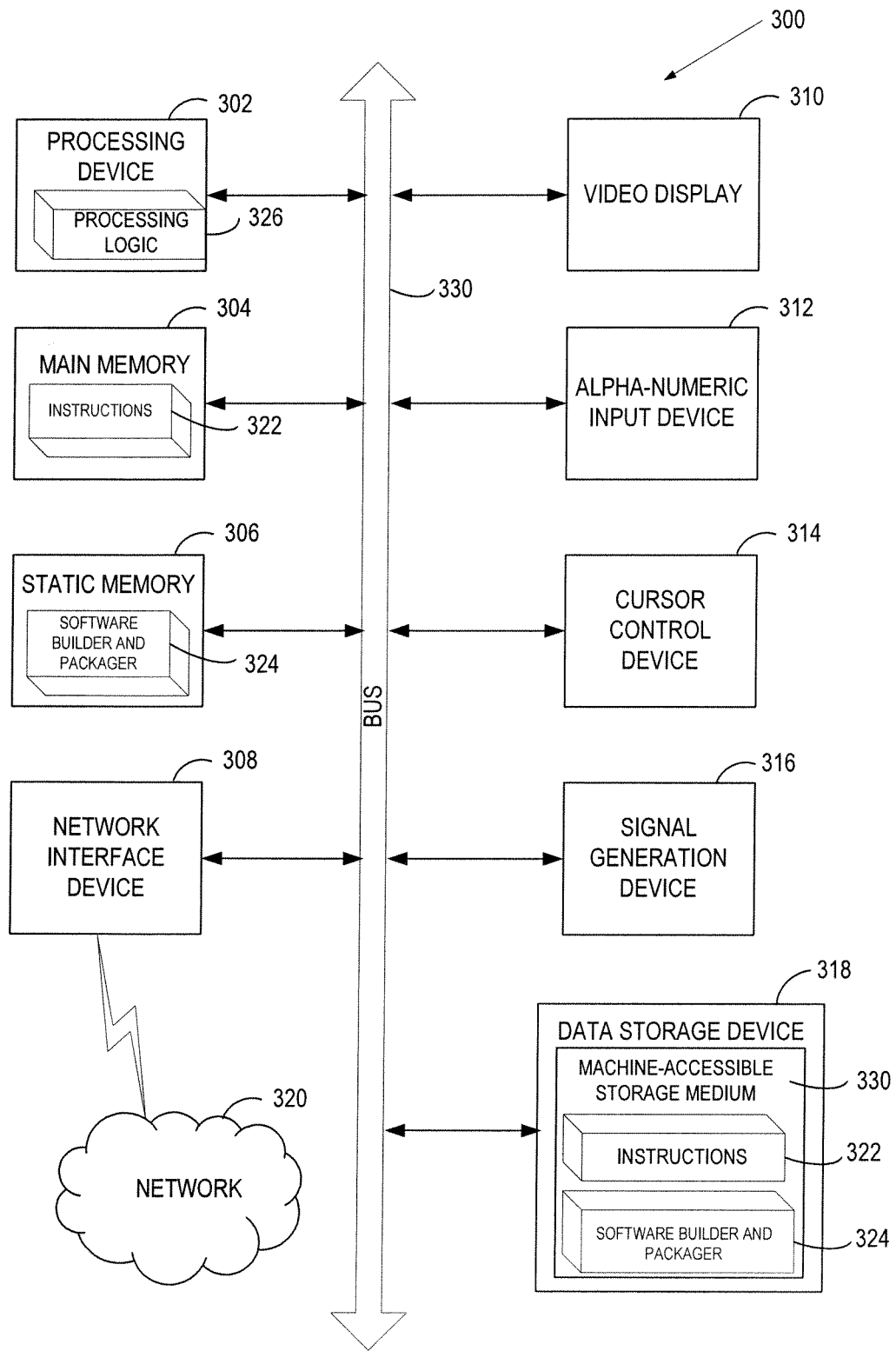
FIG. 3 is a block diagram illustrating an example of a computer system.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute modules 326 (previously described with respect to FIG. 1) for performing the operations and steps discussed herein with. In one embodiment, the modules may be include hardware or software or a combination of both.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a computer-accessible storage medium 330 on which is stored one or more sets of instructions (e.g., software 322) embodying any one or more of the methodologies or functions described herein. The software 322 may also reside, completely or at least partially, within the main memory 304 and/or within the processing device 302 during execution thereof by the computer system 300, the main memory 304 and the processing device 302 also constituting computer-accessible storage media. The software 322 may further be transmitted or received over a network 320 via the network interface device 308.

The computer-accessible storage medium 330 may also be used to store the software builder and packager 324 as presently described. The software builder and packager 324 may also be stored in other sections of computer system 300, such as static memory 306.

While the computer-accessible storage medium 330 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    building, by a processing device, a source code with a builder module in view of a project object model (POM) from a source control module, the builder module communicating with a builder file system and a building tool;
    determining a new file downloaded by the building of the source code;
    identifying the new file as a build dependency;
    storing, by the processing device, information of a referenced file of the source code and the new file in a database, the referenced file and the new file identified in the database as build dependencies;
    tracking, by the processing device, a build environment of the source code with the builder module and the referenced file;
    downloading a plugin to complete the building in view of the POM from an external plugin repository;
    scanning a local plugin repository to determine which plugins have already been downloaded; and
    re-scanning the local plugin repository to determine additional plugins and associated plugin POM files that were downloaded during the build as build dependencies.

2. The method of claim 1 further comprising:
    extracting information about the newly-built plugins and associated plugin POM files in an output directory; and
    adding the extracted information to the database for use by subsequent builds.

3. The method of claim 1, wherein the plugin comprises a jar file associated with a plugin POM file.

4. The method of claim 3 further comprising:
    parsing the plugin POM file to extract a group ID, an artifact ID, and a version;
    recording the extracted group ID, artifact ID, and version in a local plugin database.

5. A non-transitory computer-readable storage medium, having instructions stored therein, which when executed by a processing device, cause the processing device to perform comprising:
    building, by the processing device, a source code with a builder module—in view of a project object model (POM) from a source control module, the builder module communicating with a builder file system and a building tool;

determining a new file downloaded by the building of the source code;

identifying the new file as a build dependency;

storing, by the processing device, information of one a referenced file of the source code and the new file in a database, the referenced file and the new file identified in the database as build dependencies;

tracking, by the processing device, a build environment of the source code with the builder module and the referenced file;

downloading a plugin to complete the building in view of the POM from an external plugin repository;

scanning a local plugin repository to determine which plugins have already been downloaded; and re-scanning the local plugin repository to determine additional plugins and associated plugin POM files that were downloaded during the build as build dependencies.

6. The non-transitory computer-readable storage medium of claim 5 wherein the operations further comprise:

inserting information of a referenced file into a database, the one referenced file identified as build dependencies.

7. The non-transitory computer-readable storage medium of claim 5 wherein the operations further comprise:

extracting information about the newly-built plugins and associated plugin POM files in an output directory; and adding the extracted information to the database for use by subsequent builds.

8. The non-transitory computer-readable storage medium of claim 5 wherein the plugin comprises a jar file associated with a plugin POM file.

9. The non-transitory computer-readable storage medium of claim 8 wherein the operations further comprise:

parsing the plugin POM file to extract a group ID, an artifact ID, and a version;

recording the extracted group ID, artifact ID, and version in the local plugin repository.

10. A system comprising:

a processing device;

a memory to store a source control module, the source control module executable by the processing device, to store a project object model (POM); and a builder module coupled to the source control module, the builder module to build a source code in view of the POM of the source control module, to determine a new file downloaded by the building of the source code, to identify the new file as a build dependency, and to track a build environment of the source code by scanning a local plugin repository to determine a referenced file as a build dependency;

downloading a plugin to complete the building in view of the POM from an external plugin repository;

scanning the local plugin repository to determine which plugins have already been downloaded;

re-scanning the local plugin repository to determine additional plugins and associated plugin POM files that were downloaded during the build as build dependencies; and a database coupled to the builder module, the database to store information of the referenced file of the source code and the new file, the referenced file and the new file identified in the database as build dependencies.

11. The system of claim 10 wherein the builder module is to extract information about the newly-built plugins and associated plugins POM files in an output directory, and to add the extracted information to the database for use by subsequent builds.

12. The system of claim 10 wherein the plugin comprises a jar file associated with a plugin POM file, wherein the builder file system is configured to parse the plugin POM file to extract a group ID, an artifact ID, and a version, and to record the extracted group ID, artifact ID, and version in the local plugin repository.

* * * * *